(12) United States Patent  (10) Patent No.: US 8,040,629 B2
Gao  (45) Date of Patent: Oct. 18, 2011

(54) BIT AND TRACK PATTERNED RECORDING

(75) Inventor: Kaizhong Gao, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 187 days.

(21) Appl. No.: 12/262,989

(22) Filed: Oct. 31, 2008

(65) Prior Publication Data

US 2010/0110575 A1  May 6, 2010

(51) Int. Cl.
*G11B 5/02*  (2006.01)
*G11B 5/09*  (2006.01)
*G11B 5/127*  (2006.01)

(52) U.S. Cl. ............... 360/57; 360/48; 360/55; 360/110

(58) Field of Classification Search .................. None
See application file for complete search history.

(56) References Cited

U.S. PATENT DOCUMENTS

| | | | |
|---|---|---|---|
| 4,202,019 A | 5/1980 | Popoff et al. | |
| 4,480,217 A | 10/1984 | Robbins et al. | |
| 4,967,291 A | 10/1990 | Touchton et al. | |
| 5,600,506 A | 2/1997 | Baum et al. | |
| 5,774,299 A | 6/1998 | Baum et al. | |
| 5,956,216 A | 9/1999 | Chou | |
| 6,023,389 A * | 2/2000 | Cunningham | 360/75 |
| 6,937,421 B2 * | 8/2005 | Rubin et al. | 360/77.01 |
| 7,075,756 B1 * | 7/2006 | Mallary et al. | 360/317 |
| 7,082,007 B2 * | 7/2006 | Liu et al. | 360/77.02 |
| 7,609,469 B2 * | 10/2009 | Gage et al. | 360/51 |
| 2007/0258161 A1 * | 11/2007 | Richter et al. | 360/48 |
| 2009/0002896 A1 * | 1/2009 | Mallary et al. | 360/319 |

* cited by examiner

*Primary Examiner* — Daniell L Negron
*Assistant Examiner* — Regina N Holder

(57) ABSTRACT

A method of performing information storage comprises the steps of providing a medium comprising a plurality of concentric rings for storage of information. The medium is written to by a process comprising simultaneously writing and erasing elements in at least two adjacent rings, respectively a first ring and a second ring. Subsequent to simultaneously writing and erasing elements in at least the first and second rings, simultaneously writing and erasing elements in a third concentric ring, wherein the third ring is adjacent the second ring.

19 Claims, 6 Drawing Sheets

BIT AND TRACK PATTERNED RECORDING

BACKGROUND

Designers, manufacturers, and users of electronic computers and computing systems require reliable and efficient equipment for storage and retrieval of information in digital form. Conventional storage systems, such as magnetic disk drives, are typically utilized for this purpose and are well known in the art. However, the amount of information that is digitally stored continually increases, and designers and manufacturers of magnetic recording media work to increase the storage capacity of magnetic disks.

Referring to prior art FIG. 1, shown therein is a plan view of a portion of a high areal recording density bit patterned data/information storage and retrieval system 10 designed for random access operation, comprising a bit patterned medium 12, a write pole 14 of a write head (illustratively trapezoidal wedge-shaped), and a reader sensor 16. The respective opposing directions of relative movement of the medium and write pole are indicated by the arrows in the figure. The bit patterned medium 12 comprises a plurality of spaced apart magnetic elements 18 or bits of given type, e.g., longitudinal, perpendicular, multi-layer, etc., illustratively circularly-shaped "dots" arranged in a regular array on a non-magnetic substrate, i.e., in concentric rings 36 n, n+1. n+2. n+3. . . . comprised of substantially equally spaced apart dots extending in a down-ring direction, and radially extending rows 44a, b, c. . . . comprised of substantially equally spaced apart dots extending in a cross-ring direction.

Still referring to FIG. 1, it is seen that the narrower end 20 of the trapezoidal, wedge-shaped write pole 14 forms a leading edge of the write pole 14 when the latter is moved relative to medium 12, and the wider end 22 of the trapezoidal, wedge-shaped write pole 14 forms a trailing edge of the write pole 14. If the write pole of the write head is configured in conformity with the above-described requirement for the width of the write pole to be scaled down in relation to the track and bit density of the media, and therefore the maximum width of the write pole is the same as, or smaller than, the dot pitch, i.e., the spacing between dots in adjacent rings or tracks. As may be apparent, according to this scheme the concentric rings 36 n, n+1. n+2. n+3 . . . may be accessed and written to in any desired order or pattern, i.e., randomly. For example, if 4 bits were written to 6 rings in random fashion, a writing sequence could be represented as: 1111 3333 2222 4444 6666 5555. FIG. 1 illustrates writing in a random fashion, as shown by pass 1 24, pass 2 26, and pass 3 28.

In conventional magnetic disk data/information storage, the data/information is stored in a continuous magnetic thin film overlying a substantially rigid, non-magnetic disk. Each bit of data/information is stored by magnetizing a small area of the thin magnetic film using a magnetic transducer (write head) that provides a sufficiently strong magnetic field to effect a selected alignment of the small area (magnetic grain) of the film. The magnetic moment, area, and location of the small area comprise a bit of binary information which must be precisely defined in order to allow a magnetic read head to retrieve the stored data/information.

Such conventional magnetic disk storage media incur drawbacks and disadvantages which adversely affect realization of high areal density data/information storage, as follows:

(1) the boundaries between adjacent pairs of bits tend to be ragged in continuous magnetic films, resulting in noise generation during reading; and (2) the requirement for increased areal recording density has necessitated a corresponding decrease in recording bit size or area. Consequently, grain sizes of continuous film media have become extremely minute, e.g., on the order of nanometers (nm). In order to obtain a sufficient output signal to noise ratio from such minute bits, the saturation magnetization ($M_s$) should be sufficiently large and media grain size as small as possible. However, if the grain size is extremely small the loss of the magnetization of such minute bits results in a loss of stored information due to magnetization thermal fluctuation reversal, also known as the "superparamagnetic effect".

The superparamagnetic effect is a major limiting factor in increasing the areal density of continuous film magnetic recording media. Superparamagnetism results from thermal excitations which perturb the magnetization of grains in a ferromagnetic material, resulting in unstable magnetization. So-called "patterned" or "bit patterned" magnetic media ("BPM") have been proposed as a means for overcoming the magnetization reversal via the superparamagnetic effect, e.g., as disclosed in U.S. Pat. No. 5,956,216. The term "patterned" media generally refers to magnetic data/information storage and retrieval media wherein a plurality of discrete, independent regions of magnetic material form discrete, independent magnetic elements which function as recording bits are formed on a non-magnetic substrate. Since the regions of ferromagnetic material comprising the magnetic bits or elements are independent of each other, mutual interference between neighboring bits can be minimized. As a consequence, patterned magnetic media are advantageous vis-à-vis continuous magnetic media in terms of thermal stability and jitter noise from neighboring magnetic bits.

Generally, each magnetic bit or element has the same size and shape, e.g., circularly shaped "dots", and is composed of the same magnetic material as the other bits or elements. The bits or elements are arranged in a regular pattern over the substrate surface, with each bit or element having a small size and desired magnetic anisotropy, so that, in the absence of an externally applied magnetic field, the magnetic moments of each discrete magnetic bit or element will be aligned along the same magnetic easy axis. Stated differently, the magnetic moment of each discrete magnetic bit or element has only two states; the same in magnitude but aligned in opposite directions. Each discrete magnetic bit or element forms a single magnetic domain and the size, area, and location of each domain is determined during the fabrication process.

During writing operation of bit patterned media, the direction of the magnetic moment of the single magnetic domain element or bit is flipped along the easy axis, and during reading operation, the direction of the magnetic moment of the single magnetic domain element or bit is sensed. While the direction of the magnetic easy axis of each of the magnetic domains, elements, or bits can be parallel or perpendicular to the surface of the domain, element, or bit, corresponding to conventional continuous longitudinal and perpendicular media, respectively, patterned media comprised of domains, elements, or bits with perpendicularly oriented magnetic easy axis are advantageous in achieving higher areal recording densities for the reasons given above.

Notwithstanding the substantial increase in recording/data storage performance capability afforded by bit patterned media (BPM) vis-a-vis conventional continuous film-based media, the escalating requirement for even higher areal recording densities engenders a significant problem in writing data/information to ultra-high areal recording density media arising from limitation of the available write head field at very high track densities, e.g., >~300 ktpi. From a solid angle viewpoint, it is evident that the available recording (write) field decreases as track density increases. The primary reason for this effect is the requirement for reduction in the pole width of the write head, necessitated by the reduction in track spacing (pitch) and bit size in ultra-high areal recording density media, leading to a corresponding reduction in the total write field applied to the media. In addition to the requirement for reduction in the write pole width as track density increases, the length of the write pole must be reduced in order to mitigate problems arising when the write head is at skew. Disadvantageously, however, the head-to-media spacing ("HMS") and media thickness cannot be scaled down to the same extent as the write pole width in order to remedy or at least mitigate the aforementioned problem.

In view of the foregoing, there exists a clear need for improved systems and methodology for facilitating accurate writing to media with very high to ultra-high areal recording densities.

SUMMARY

According to an aspect of the present invention, the foregoing and other advantages are obtained in part by an improved method of performing information storage, comprising steps of providing a medium comprising a plurality of concentric rings for storage of information and writing to the medium. The medium is written to by a process comprising simultaneously writing and erasing elements in at least two adjacent rings, respectively a first ring and a second ring. Subsequent to simultaneously writing and erasing elements in at least the first and second rings, simultaneously writing and erasing elements in the second ring and a third concentric ring, wherein the third ring is adjacent the second ring.

Another embodiment of the present invention is an information storage system comprising a medium comprising a plurality of concentric rings for storage of information. The system further comprises a write head with a write pole having first and second ends, respectively forming leading and trailing edges of the write pole. The medium is written to by a process comprising simultaneously writing and erasing elements in at least two adjacent rings, respectively a first ring and a second ring. Subsequent to simultaneously writing and erasing elements in at least the first and second rings, simultaneously writing and erasing magnetic elements in the second ring and a third concentric ring, wherein the third ring is adjacent the second ring.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the features are not necessarily drawn to scale but rather are drawn as to best illustrate the pertinent features, wherein.

DETAILED DESCRIPTION OF THE INVENTION

The present invention has been made with the aim of providing improvement in bit patterned magnetic recording systems and methodologies for satisfying the continuously escalating requirements for even higher areal recording densities (e.g., track and bit densities on the order of >~300 ktpi and Tbit/in$^2$, respectively) in computer-related data/information storage and retrieval applications. As indicated supra, there exists a clear need for systems and methodology which overcome the above described difficulties associated with the limitations on write field arising for the conventional requirement for scaling down the size of the write head pole as bit and track density increase, and facilitating accurate writing to bit patterned media with very high to ultra-high areal recording densities.

According to the present invention, a solution at the drive level to the above-mentioned problem with very high to ultra-high areal recording density bit patterned media and systems is termed "banded technology", also known as the "bandit approach", and comprises utilizing a wider write head than conventionally employed to write the data rings in a single pass, whereby a gain in write field is obtained. However, instead of complete random access of the data rings, this approach requires sequential writing of data rings adjacent a just-written data ring. To accomplish this, when writing a data track the write head will pass over a first data ring and partially pass over ("trim") an adjacent data ring. Since each data track will be written only once before complete erasure, tolerance of erasure from the media side is relatively large. In addition, a wider write head or pole can be utilized and a comparatively narrower data tracks can be written. Less track edge noise is induced since the guard band is practically removed. As a consequence, areal recording density at drive level is increased by a small amount, with loss of only a small amount of media area which cannot be utilized for data storage. Also, data access is not completely random and the increase in write head width is limited so as to not result in curvature of the trimmed track.

Figure 1:
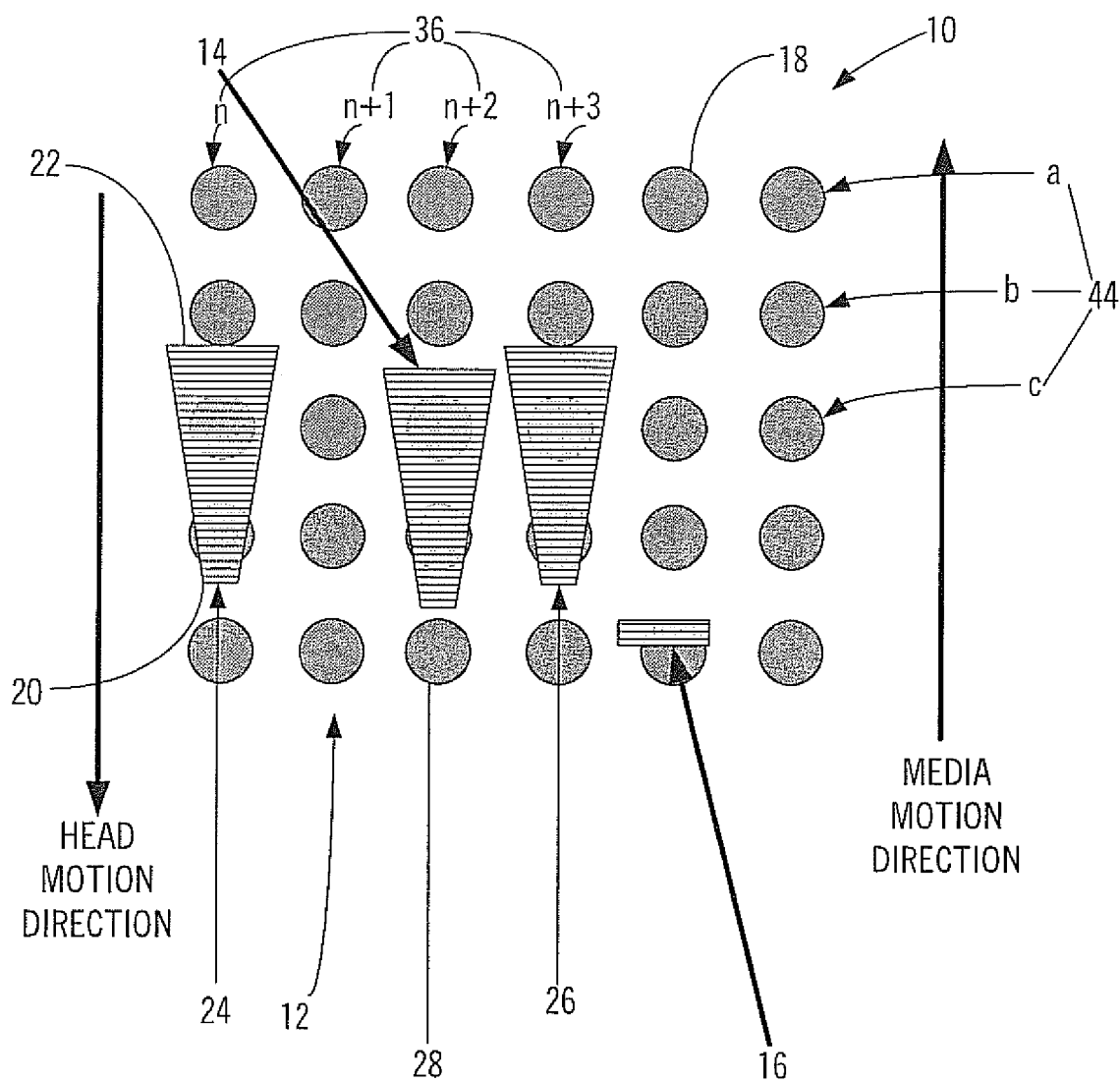
FIG. 1 is a plan view of a portion of a bit patterned information storage and retrieval system.
Figure 2:
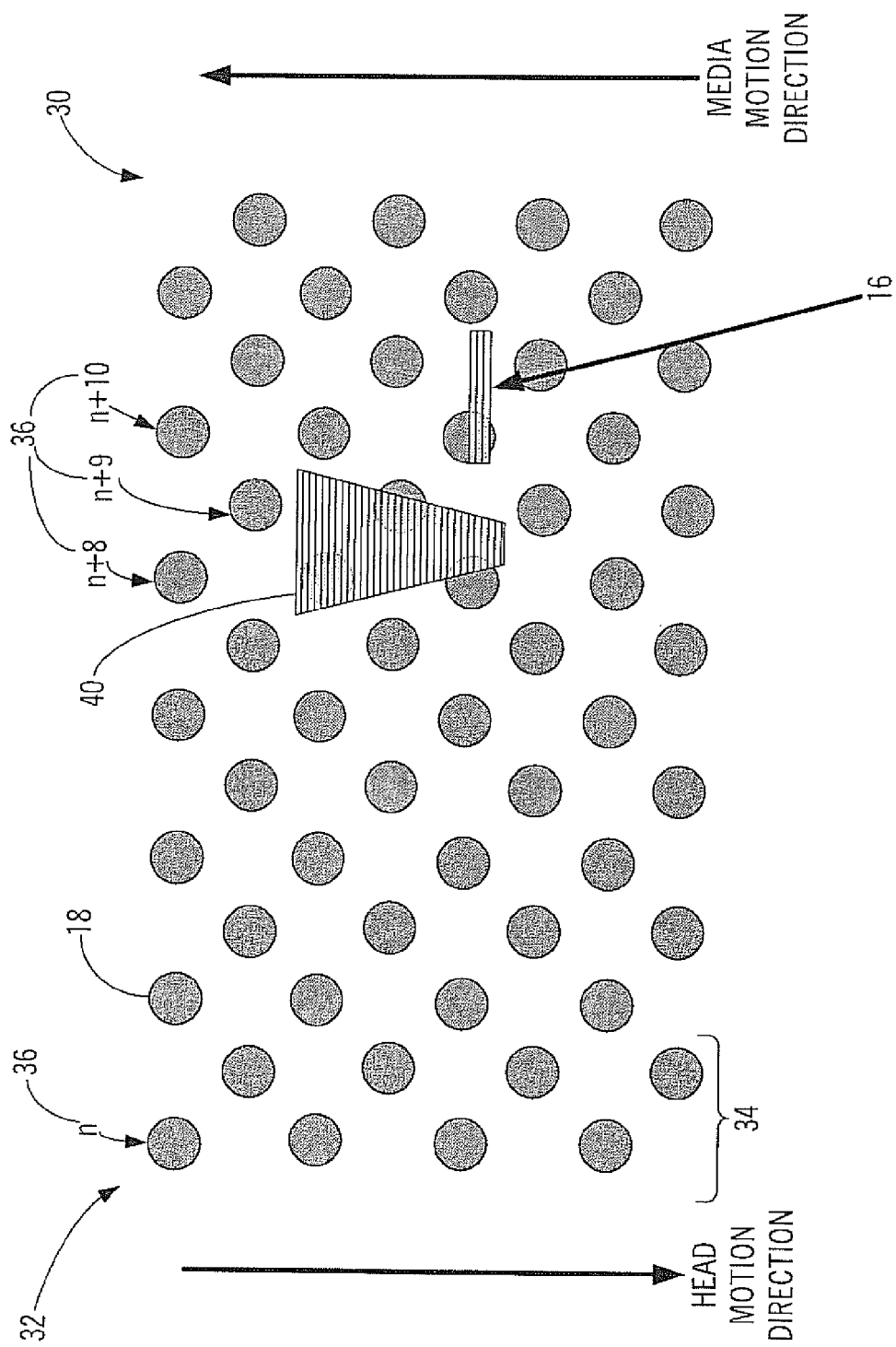
FIG. 2 is a plan view of a portion of a bit patterned information storage and retrieval system with staggered isolated elements according to an embodiment of the invention.

Adverting to FIG. 2, shown therein is a plan view of a portion of a bit patterned data/information storage and retrieval system 30, according to a non-limiting embodiment of the present invention, designed for "stagger" mode operation. System 30 comprises a bit patterned medium 32 which differs from that of system 10 shown in FIG. 1 in that the dots 18 in concentric rings 36 n, n+1. n+2. n+3. . . . and radially extending rows 46a, b, c . . . are arranged in a pattern such that the immediately adjacent rings 36 and rows 46 are staggered with respect to each other, and dots 18 in alternating rings 36 are radially aligned. A majority of dots 18 are therefore surrounded by 8 neighboring dots 18. A track 34 comprises two adjacent rings 36. According to this system, as shown in the figure, as the write pole 40 moves in a down track direction, a dot 18 in ring n+8 36 is initially completely covered and therefore fully written by the write pole 40, while at the same time the neighboring down track dot 18 in ring n+9 36 is only partially covered and therefore only partially written ("trimmed") by the write pole 40. As the write pole continues to move in a down track direction, the down track dot 18 in ring n+9 36 is completely covered and therefore fully written by the write pole 40, while at the same time the neighboring down track dot 18 in ring n+8 36 is only partially covered and therefore partially written by the write pole 40. Hence writing of the medium occurs in a staggered fashion.

The media may be read back in the same manner. In certain embodiments of the present invention, the mode of operation of system 30 is to have the write pole 40 write two data rings 36 at the same time and read back two data rings 36 at the same time, because the symmetry between even- and odd-numbered data rings is the same. In this instance, a write pole 40 having a width about twice as large as that of system 10 of FIG. 1 can be utilized.

Figure 3:
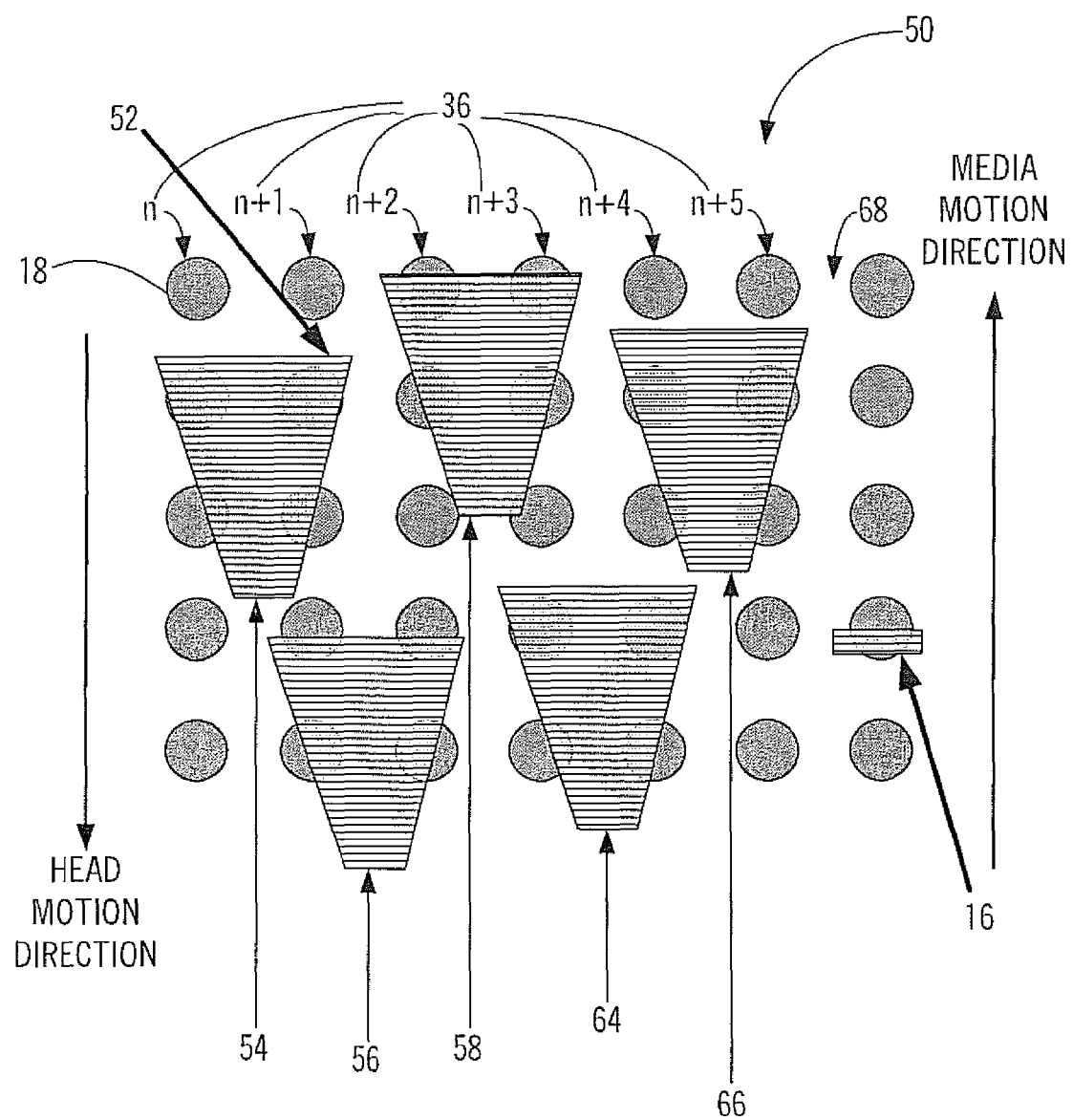
FIG. 3 is a plan view of a portion of a bit patterned data/information storage and retrieval system according to another embodiment of the present invention.

Adverting to FIG. 3, shown therein is a plan view of a portion of a bit patterned information storage and retrieval system 50 according to an illustrative, but non-limitative embodiment of the present invention, illustrating operation of one embodiment of the present invention. In this embodiment, the dots 18 in immediately adjacent rings 36 are radially aligned. Though the illustrated write head pole 52 has a trapezoidal wedge shape, write head poles having other shapes, e.g., triangular or square shapes, and BPM with bits having shapes other than circularly-shaped "dots", e.g., square-shaped, are also possible according to the principles of the present invention. Further, while in the illustrated embodiment the width of the write head pole 52 is about two magnetic element widths, write pole widths ranging from about 1.2 times to greater than 2 times the magnetic element width also may be used according to this approach. In certain embodiments of the invention, the write head can be asymmetric shaped. As a consequence of the increased width of the write pole, significant write fields are achievable even at bit densities on the order of ~500 Gdots/in². When the dots 18 in immediately adjacent rings 36 are radially aligned each ring 36 forms one track and read back can be performed on one data track at a time.

In more detail, according to an embodiment of the present invention, the problem of limited write head field is mitigated without scaling down the write pole width in relation to the bit density. The magnitude of the write field is maintained and the requisite data track width achieved by writing overlapping data rings. Data are written such that individual data packages are recorded sequentially. For example, and with reference to FIG. 3, if information is written to isolated discrete magnetic storage packets in a $1^{st}$ pass 54 of the write pole 52 over the medium 68, dots 18 in adjacent rings 36, e.g., rings n and n+1 are written; in a $2^{nd}$ pass 56 of the write pole 52 over the medium 68, the dots 18 in adjacent rings 36 n+1 and n+2 are written, effectively overwriting the dots 18 previously written in ring 36 n+1 in the $1^{st}$ pass 54; in a $3^{rd}$ pass 58 of the write pole 52 over the medium 68, the dots 18 in adjacent rings 36 n+2 and n+3 are written, effectively overwriting the dots 18 previously written in ring 36 n+2 in the $2^{nd}$ pass 56; in a $4^{th}$ pass 64 of the write pole 52 over the medium 68, the dots 18 in adjacent rings 36 n+3 and n+4 are written, effectively overwriting the dots 18 previously written in ring n+3 in the $3^{rd}$ pass 58; in the $5^{th}$ pass 66 of the write pole 52 over the medium 68, the dots 18 in adjacent rings 36 n+4 and n+5 are written, effectively overwriting the dots 18 previously written in ring 36 n+4 in the $4^{th}$ pass 64, etc. For example, a sequence for 2 ring mode writing of 6 rings with 4 bits/ring, wherein one ring is written and one ring is erased, may be represented as: 1111(2222) 2222(3333) 3333(4444) 4444(5555) 5555 (6666), where the parentheses ( ) represents (partially) erased data. Data in ring 6 cannot be used after writing in this example.

Thus, according to this embodiment of the invention, data written to a first data track would be written to rings 1 and 2, and data written to a second track would be written to rings 3 and 4. In certain embodiments of the present invention, the rings are written sequentially.

Figure 4:
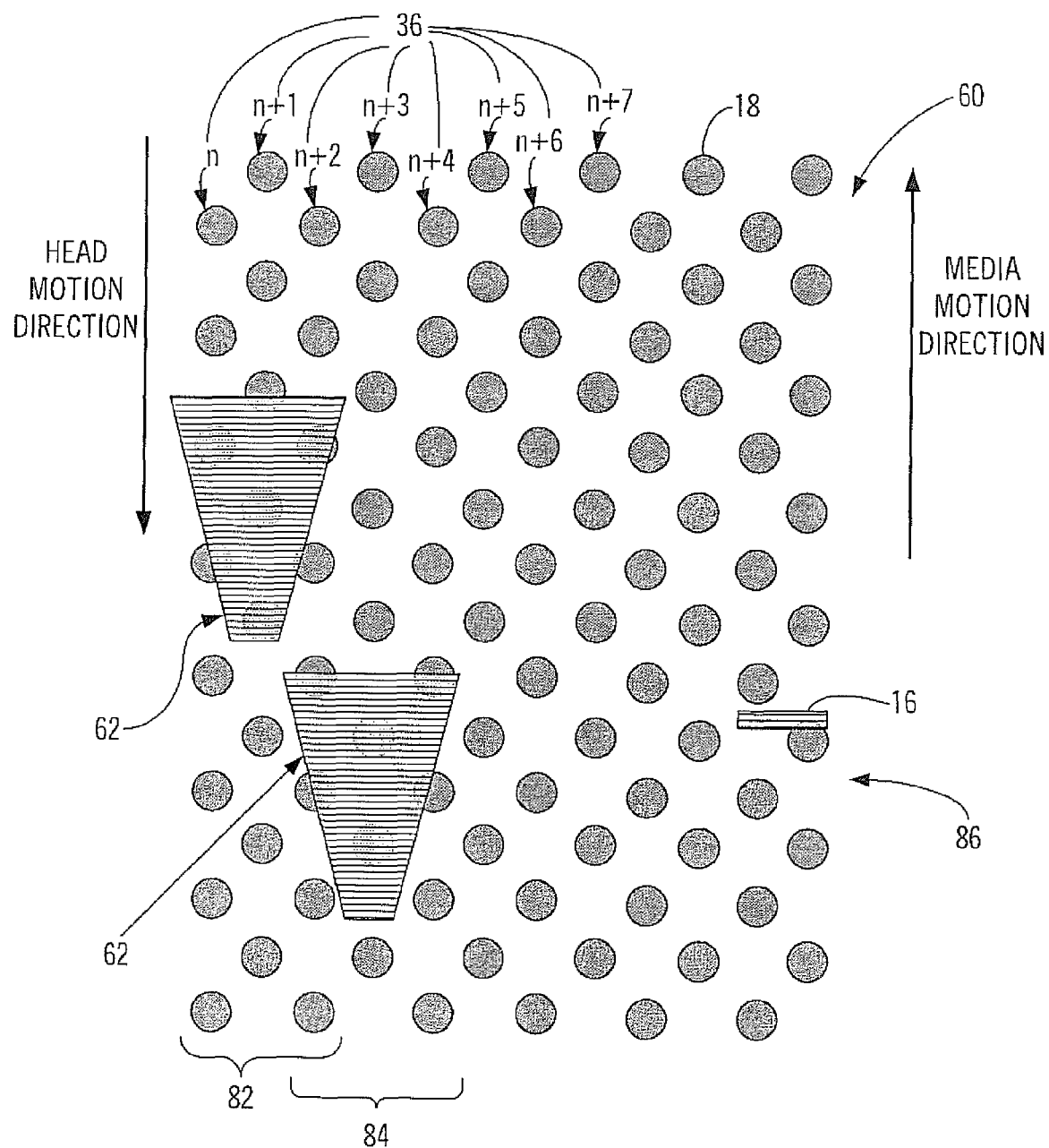
FIG. 4 is a plan view of a portion of a bit patterned data/information storage and retrieval system according to another embodiment of the present invention.

Referring to FIG. 4, shown therein is a plan view of a portion of a bit patterned information storage and retrieval system 60 according to another illustrative, but non-limitative, embodiment of the present invention. In this embodiment, the dots 18 are arranged in a staggered mode, as illustrated in FIG. 4. The concentric rings 36 of dots 18 are staggered so that the dots 18 in every other concentric ring 36 are radially aligned. According to this embodiment, the width of the write head pole 62 can be much wider than the track pitch, for example, about the width of three or more immediately adjacent concentric rings 36, and a significant write field is achievable even at bit densities on the order of ~1 Tdot/in². As with the embodiment shown in FIG. 3, write head poles having other than trapezoidal wedge shape, e.g., triangular or square shape, and BPM with bits having shapes other than circularly-shaped "dots", e.g., square-shaped and elliptical-shaped, are also possible according to embodiments of the present invention.

In more detail, according to this embodiment, the problem of limited write head field is mitigated without scaling down the write pole width in relation to the bit density. The magnitude of the write field is maintained and the requisite data track width achieved by writing overlapping data rings in staggered fashion. Data are written such that individual, isolated, discrete data packages are recorded sequentially. For example, and with reference to FIG. 4, in a $1^{st}$ pass 82 of the write pole 62 over the medium 86, dots in adjacent rings 36 n, n+1. and n+2 are simultaneously written. Dots 18 in ring n+1 are fully covered, hence written, as the write pole 62 moves in a down track direction, but dots 18 in each of rings 36 n and n+2 alternate (stagger) between partial and full coverage by the write pole 62. In a subsequent $2^{nd}$ pass 84 of the write pole 62 over the medium 86, dots 18 in ring 36 n+2 previously written in the $1^{st}$ pass 82 are overwritten and dots 18 in rings 36 n+3 and n+4 are written. As in the $1^{st}$ pass 82, dots 18 in ring 36 n+3 are fully covered, hence written, as the write pole 62 moves in a down track direction, but dots 18 in rings 36 n+2 and n+3 alternate (stagger") between partial and full coverage by the write pole 62. This process is repeated for the subsequent passes 3, 4, 5, 6. etc. (not shown). For example, a sequence for 3 ring mode writing of 7 rings with 4 bits/ring, wherein one ring is written and one ring is erased, may be represented as: 12(3)12(3)12(3)12(3) 34(5)34(5)34(5)34(5) 56(7)56(7)56(7)56(7), where the parentheses ( ) represents (partially) erased data. Data in ring 7 cannot be used after writing in this example.

Thus, according to operation in accordance with this embodiment, data is written to the medium 86 such that individual data packages are recorded sequentially, i.e., rings 36 n, n+1. and n+2 are written in a $1^{st}$ pass 82; in the $2^{nd}$ pass 84, ring n+2 is overwritten, and rings 36 n+3 and n+4 are written; in the $3^{rd}$ pass (not shown), ring 36 n+4 is overwritten, and rings 36 n+5 and n+6 are written, etc. The higher index ring overwrites an edge of the next lower index ring.

According to this embodiment, written data is read back utilizing the reader/sensor in a staggered mode, and a much smaller dot size is possible with sufficiently large write pole size for obtaining recording densities on the order of about 1 Tdot/in$^2$.

Thus, according to the present invention, due to the separation of dots in bit patterned media (BPM), optimization of the write head to dot size ratio is facilitated, as compared with conventional perpendicular recording media and systems. Further, as compared with conventional BPM media and systems, the embodiments of the present invention offer the potential for much lower cost systems with substantially increased areal recording density of 1 Tdot/in$^2$ range and greater.

Figure 5:
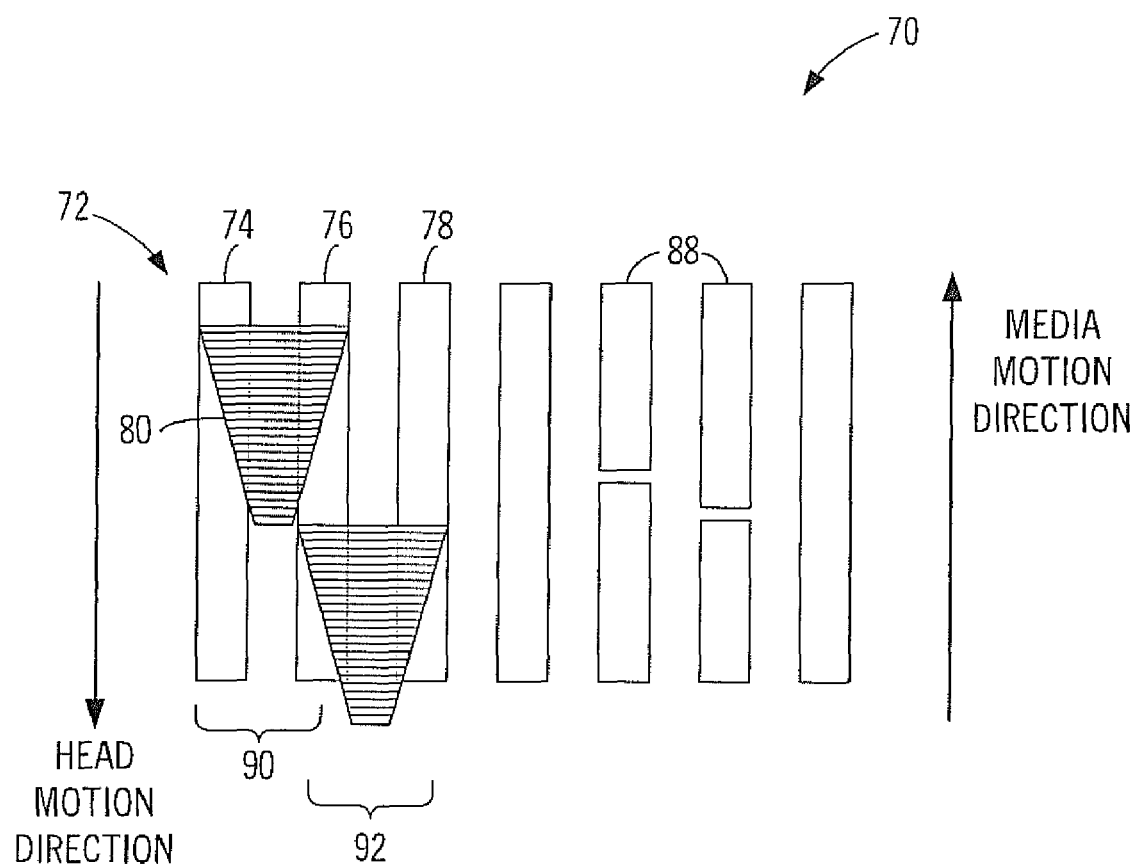
FIG. 5 is a plan view of a portion of a track patterned data/information storage and retrieval system according to another embodiment of the present invention.

In certain embodiments of the present invention, rather than a series of dots, a ring can comprise a continuous magnetic element forming an annulus or a plurality of magnetic elements substantially forming an annulus. FIG. 5 is a plan view of a portion of a track patterned data/information storage and retrieval system 70, according to a non-limiting embodiment of the present invention. System 70 comprises a track patterned medium 72. The rings 74, 76, 78 of the track patterned medium 72 can be continuous concentric rings or each ring can comprise a plurality of magnetic elements which substantially form an annulus. Rings 88 illustrate a plurality of elements which substantially form an annulus. According to this system, a write pole 80 moves in a down track direction. In a 1$^{st}$ pass 90 of the write pole 80 over the medium 72, adjacent first and second rings 74, 76 are simultaneously written. In a 2$^{nd}$ pass 92 of the write pole 80 over the medium 72, adjacent second and third rings 76, 78 are simultaneously written, effectively overwriting the second ring 76 previously written in the 1$^{st}$ pass 90. Additional rings are sequentially written by repeating the foregoing steps.

Figure 6:
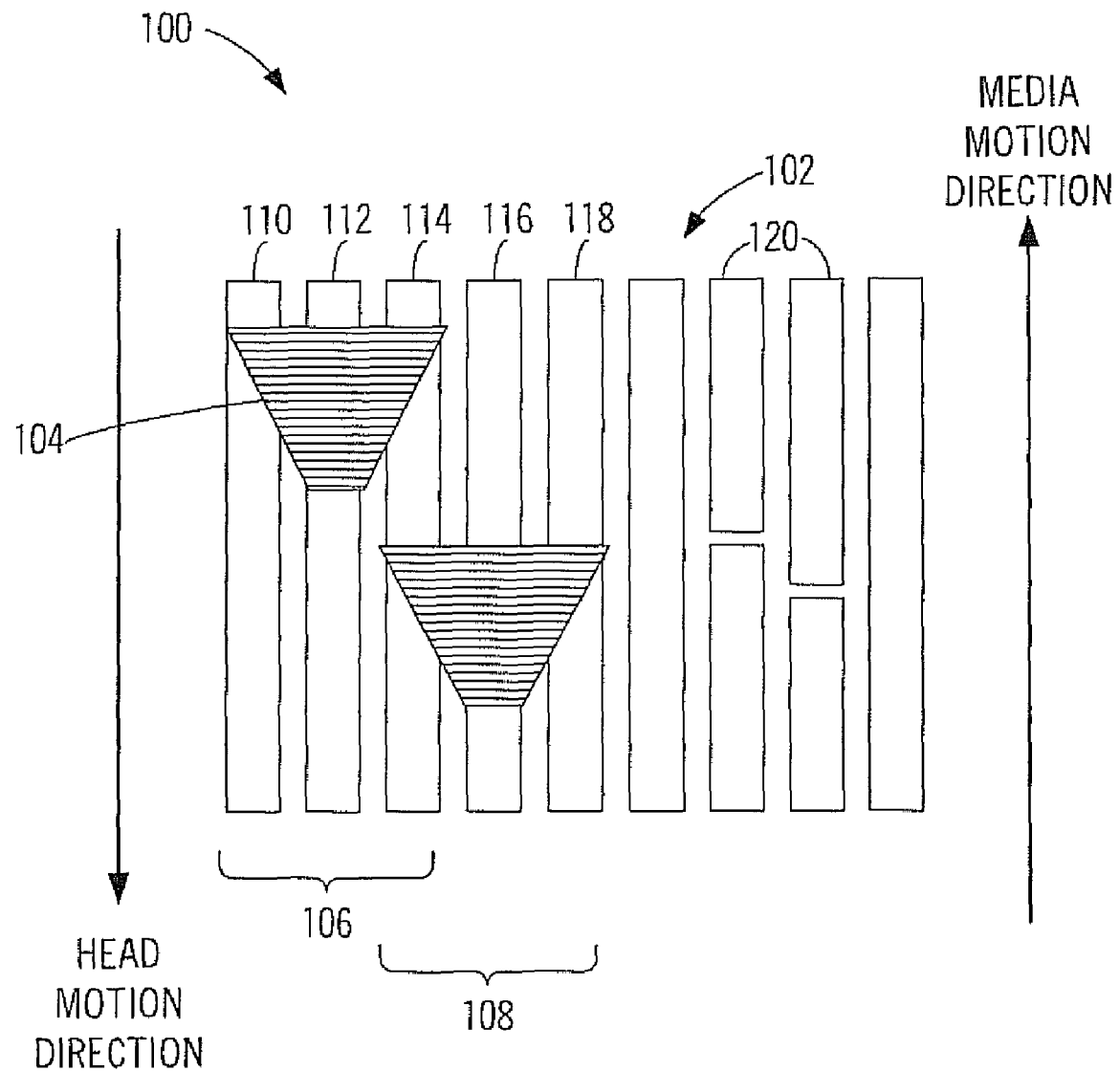
FIG. 6 is a plan view of a portion of a track patterned data/information storage and retrieval system according to another embodiment of the present invention.

FIG. 6 is a plan view of a portion of a track patterned data/information storage and retrieval system 100, according to another non-limiting embodiment of the present invention. System 100 comprises a track patterned medium 102. The rings 110, 112, 114, 116, 118 of the track patterned medium 102 can be continuous concentric rings or each ring can comprise a plurality of magnetic elements which substantially form an annulus. Rings 120 illustrate a plurality of elements which substantially form an annulus. According to this system, a write pole 104 moves in a down track direction. In a 1$^{st}$ pass 106 of the write pole 104 over the medium 102, the write pole 104 is centered over a second ring 112 and second ring 112 along with adjacent first and third rings 110, 114 on left and right-hand sides of the second ring 112, respectively, are written. In a 2$^{nd}$ pass 108 of the write pole 104 over the medium 102, the write pole 104 is centered over a fourth ring 116 adjacent the third ring 114 and a fifth ring 118 on left and right-hand sides of the fourth ring 116, respectively, are written, effectively overwriting the third ring 114 previously written in the 1$^{st}$ pass 106. Additional rings are sequentially written by repeating the foregoing steps.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is understood that the present invention is capable of use in various other combinations and environments and is susceptible to changes and/or modifications within the scope of the inventive concept as expressed herein.

What is claimed is:

1. A method comprising:
   simultaneously writing and erasing elements in at least two adjacent rings, respectively a first ring and a second ring; and
   subsequent to said simultaneously writing and erasing elements in at least said first and second rings, simultaneously writing and erasing elements in a third ring, wherein said third ring is adjacent said second ring, wherein
   said first ring, said second ring, and said third ring are concentric rings for storage of information on a medium, and
   said writing and erasing elements in said first ring, said second ring, and said third ring occur in a single pass.

2. The method according to claim 1, wherein each concentric ring comprises a plurality of isolated elements.

3. The method according to claim 2, wherein said elements are isolated magnetic elements.

4. The method according to claim 3, wherein said medium is a bit-patterned magnetic recording medium comprising a plurality of data tracks.

5. The method according to claim 4, wherein a data track comprises a pair of immediately adjacent rings.

6. The method according to claim 1, wherein said rings comprise one of:
   a continuous magnetic element forming an annulus and,
   a plurality of magnetic elements substantially forming an annulus.

7. The method according to claim 1, further comprising:
   repeating said writing to said medium as necessary to sequentially write said elements in additional concentric rings.

8. The method according to claim 1, wherein said medium is a disk-shaped magnetic recording medium.

9. The method according to claim 1, further comprising writing to said medium with a write head comprising a write pole having first and second ends, respectively forming leading and trailing edges of said write pole.

10. The method according to claim 9, wherein:
    said write head further comprises a trapezoidal wedge-shaped write pole having a maximum width at said trailing edge.

11. A system comprising:
    a medium comprising a plurality of concentric rings for storage of information;
    a write head comprising a write pole having first and second ends, respectively forming leading and trailing edges of said write pole; and
    a processor configured to:
       simultaneously write and erase elements in at least two adjacent rings, respectively a first ring and a second ring; and
       subsequent to said simultaneously writing and erasing elements in at least said first and second rings, simultaneously write and erase magnetic elements in said second ring and a third ring, wherein said third ring is adjacent said second ring, wherein
       said writing and erasing elements in said first ring, said second ring, and said third ring occur in a single pass.

12. The system according to claim 11, wherein each concentric ring comprises a plurality of isolated elements.

13. The system according to claim 12, wherein said elements are isolated magnetic elements.

14. The system according to claim 11, wherein said medium is a bit-patterned magnetic recording medium comprising a plurality of data tracks.

15. The system according to clam 14, wherein a data track comprises a pair of immediately adjacent rings.

16. The system according to claim 11, wherein said medium is a disk-shaped magnetic recording medium.

17. The system according to claim 11, wherein said plurality of concentric rings comprises one of:

a continuous magnetic element forming an annulus and, a plurality of magnetic elements substantially forming an annulus.

18. The system according to claim 11, wherein:

said write head further comprises a trapezoidal wedge-shaped write pole having a maximum width at said trailing edge.

19. The system according to claim 11, wherein:

said medium comprises a plurality of perpendicular magnetic elements.

* * * * *